US012585604B2

(12) United States Patent
Chaudhary et al.

(10) Patent No.: US 12,585,604 B2
(45) Date of Patent: Mar. 24, 2026

(54) EFFICIENT CHIP-TO-CHIP COMMUNICATIONS

(71) Applicant: NVIDIA Corporation, Santa Clara, CA (US)

(72) Inventors: Anurag Chaudhary, San Jose, CA (US); Guan Wang, San Jose, CA (US); Harsh Kumar, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 149 days.

(21) Appl. No.: 18/449,979

(22) Filed: Aug. 15, 2023

(65) Prior Publication Data

US 2025/0061078 A1 Feb. 20, 2025

(51) Int. Cl.
*G06F 13/40* (2006.01)
*G06F 12/0831* (2016.01)
*G06F 15/173* (2006.01)

(52) U.S. Cl.
CPC ...... *G06F 13/4031* (2013.01); *G06F 12/0835* (2013.01); *G06F 15/17337* (2013.01)

(58) Field of Classification Search
CPC ............. G06F 12/0835; G06F 13/4031; G06F 15/17337
See application file for complete search history.

(56) References Cited

U.S. PATENT DOCUMENTS

| | | | | |
|---|---|---|---|---|
| 2002/0169935 A1* | 11/2002 | Krick | ................. | G06F 12/0831 |
| | | | | 711/158 |
| 2006/0020752 A1* | 1/2006 | Schnapp | ............. | G06F 12/0804 |
| | | | | 711/143 |
| 2014/0040561 A1* | 2/2014 | Lih | ..................... | G06F 12/0831 |
| | | | | 711/146 |
| 2020/0233804 A1* | 7/2020 | Gandhi | ............... | G06F 12/1009 |
| 2022/0100661 A1* | 3/2022 | Apte | .................. | G06F 12/0831 |
| 2022/0318136 A1* | 10/2022 | Garg | .................. | G06F 12/0835 |
| 2023/0067307 A1* | 3/2023 | Natarajan | ........... | G06F 12/1441 |
| 2024/0211403 A1* | 6/2024 | Appu | ................. | G06F 12/0875 |
| 2024/0241830 A1* | 7/2024 | Patel | .................. | G06F 12/0873 |

* cited by examiner

*Primary Examiner* — Eric T Oberly
(74) *Attorney, Agent, or Firm* — IRON SUMMIT IP LLP

(57) ABSTRACT

In various examples, when a bridge of a chip has received an eviction request from a client of the chip, the bridge may transmit a read request that corresponds to the same cache line to another chip without waiting for an inter-chip completion response for the eviction request. When the read request is received, the bridge may determine whether the eviction request has already been sent to the other chip and transmit the read request based at least on the eviction request being sent to the other chip using an ordered communication network to ensure the communications are received and/or processed by the other chip in an order that maintains memory coherency. Additionally, the chips may process read unique requests without using an inter-chip completion acknowledgement and may process copy back requests by transmitting corresponding copy back write data with the copy back requests.

20 Claims, 9 Drawing Sheets

400

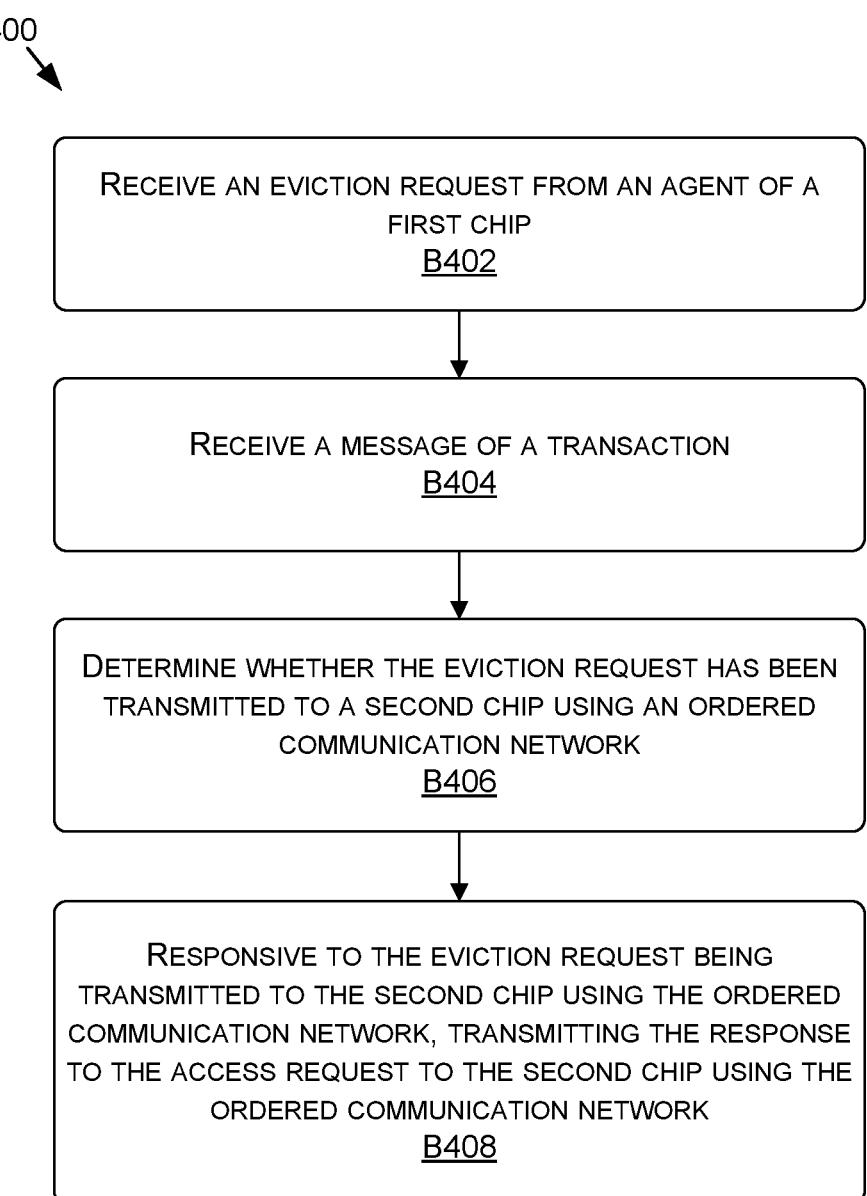

RECEIVE AN EVICTION REQUEST FROM AN AGENT OF A
FIRST CHIP
B402

RECEIVE A MESSAGE OF A TRANSACTION
B404

DETERMINE WHETHER THE EVICTION REQUEST HAS BEEN
TRANSMITTED TO A SECOND CHIP USING AN ORDERED
COMMUNICATION NETWORK
B406

RESPONSIVE TO THE EVICTION REQUEST BEING
TRANSMITTED TO THE SECOND CHIP USING THE ORDERED
COMMUNICATION NETWORK, TRANSMITTING THE RESPONSE
TO THE ACCESS REQUEST TO THE SECOND CHIP USING THE
ORDERED COMMUNICATION NETWORK
B408

RECEIVE A REQUEST TO RELINQUISH OWNERSHIP OF A
PORTION OF MEMORY
B502

RECEIVE A MESSAGE CORRESPONDING TO THE PORTION
OF MEMORY
B504

DETERMINE THE MESSAGE AND THE REQUEST
CORRESPOND TO THE PORTION OF MEMORY
B506

BASED AT LEAST ON THE DETERMINATION, PUSH, OVER AN
ORDERED COMMUNICATION NETWORK, THE REQUEST FROM
A FIRST CHIP TO A SECOND CHIP USING THE MESSAGE
B508

600

700

EFFICIENT CHIP-TO-CHIP COMMUNICATIONS

BACKGROUND

Chip-to-chip (C2C) communication protocols facilitate the transfer of data between different chips in a computing system. Such protocols may dictate the format, timing, and electrical characteristics of the signals used to transfer data between chips. Efficient use of input/output (IO) bandwidth between chips is crucial for high-speed communication and optimal system performance. The amount of data that can be transferred between chips may be limited by the available IO bandwidth, which can be a bottleneck in modern high-performance computing systems. Further, processing messages over IO links is often a significant source of power consumption. To maximize the efficiency of C2C communications, it may be desirable to minimize the amount of overhead associated with signaling and data transfer, as well as to optimize the use of available IO bandwidth.

The Advanced Microcontroller Bus Architecture-Coherent Hub Interface (AMBA-CHI) protocol is a high-performance, scalable, and coherent interconnect protocol for use in systems-on-chip (SoCs). AMBA-CHI provides a standard set of rules and procedures for communication and coherency between different nodes within an SoC. SoCs can have varying features and the AMBA-CHI protocol is designed to be suitable for a wide range of SoCs, including those with different performance requirements and coherence needs. However, some features of AMBA-CHI, or other C2C communication protocols, such as coherency traffic rules, may address aspects of system design that are not necessary for particular systems, which can result in the inefficient use of IO bandwidth between chips.

SUMMARY

Embodiments of the present disclosure relate to efficient chip-to-chip communications. Systems and methods are disclosed that can be used to reduce the IO bandwidth, power consumption, and latency required for chips to communicate over chip-to-chip (C2C) while maintaining memory coherency.

In contrast to conventional systems, such as those described above, in at least one embodiment, when an interconnect bridge of a chip has received an eviction request from a client of the chip, the interconnect bridge may transmit, C2C, a read request (or snoop response) corresponding to the same portion of memory without waiting for an inter-chip completion response for the eviction request. In at least one embodiment, based at least on the read request corresponding to the same portion of memory as the eviction request, the interconnect bridge may determine whether the eviction request has already been sent to the other chip. Based at least on the determination, the interconnect bridge may transmit the read request based at least on the eviction request being sent to the other chip (the read request may push the eviction request to the other chip). The eviction request and the read request are transmitted using an ordered communication network, which ensures the communications are received and/or processed by the other chip in an order that maintains memory coherency.

In further respects, in at least one embodiment, when an interconnect bridge of a chip has provided an inter-chip completion data response for a read unique (or more generally a read, or a coherent read) request to another chip, the interconnect bridge may provide an internal completion acknowledgement, thereby maintaining coherency to a client of the chip without waiting for an inter-chip completion acknowledgement from the other chip. In further respects, in at least one embodiment, an interconnect bridge of a chip may transmit copy back write data with a corresponding copy back request from a client to another chip, rather than first transmitting the copy back request to the other chip and waiting until a corresponding completion database identifier response is received from the other chip to send out the copy back write data.

BRIEF DESCRIPTION OF THE DRAWINGS

The present systems and methods for efficient chip-to-chip communications are described in detail below with reference to the attached drawing figures, wherein:

FIG. 4 is a flow diagram showing a method for processing an eviction request using an ordered communication network, in accordance with some embodiments of the present disclosure;

DETAILED DESCRIPTION

Figure 1A:
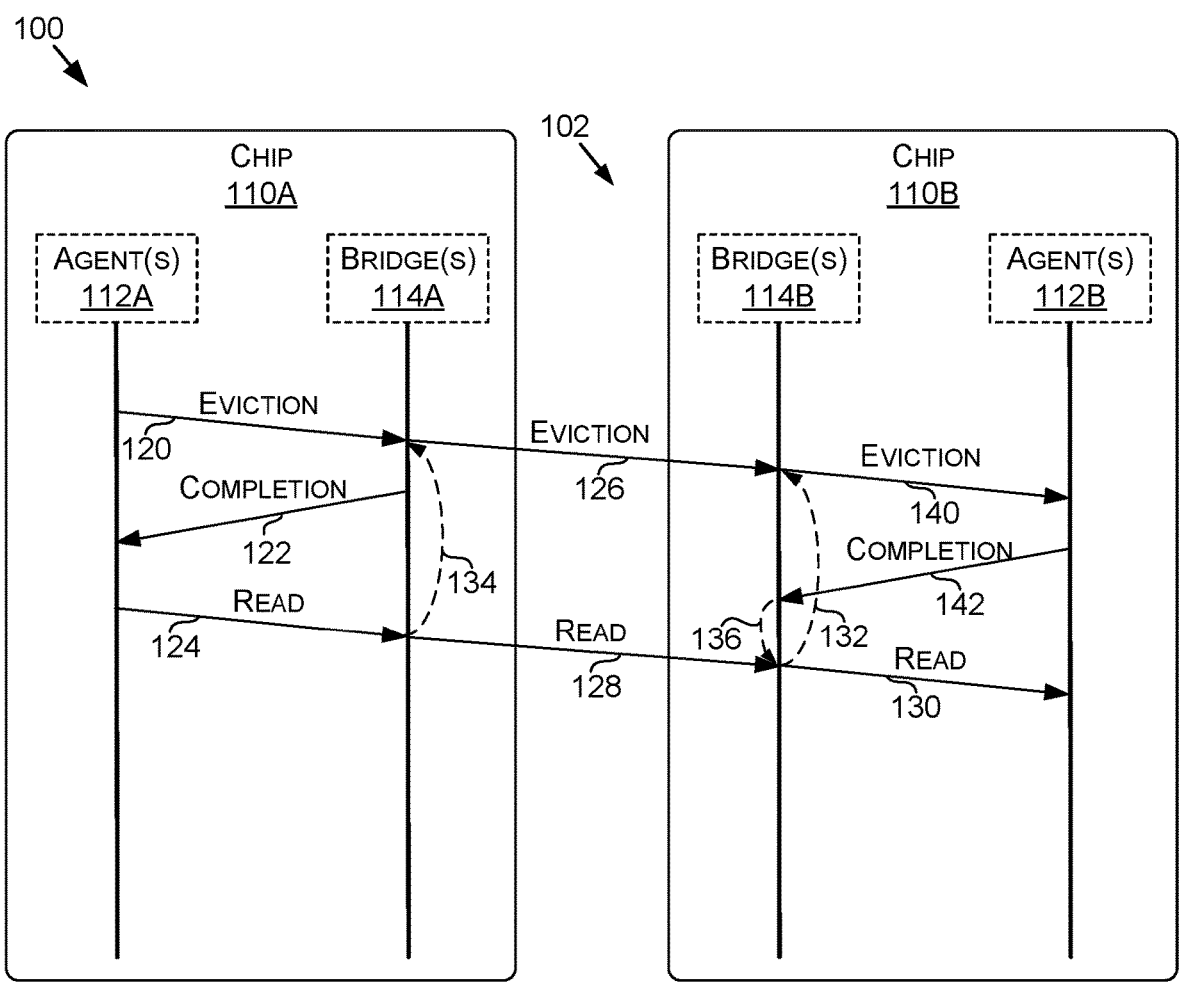
FIG. 1A includes a data flow diagram for an example of a process for processing an eviction request using chip-to-chip communications without using an inter-chip completion response, in accordance with some embodiments of the present disclosure.

Systems and methods are disclosed related to efficient chip-to-chip communications. Systems and methods are disclosed that can be used to reduce the IO bandwidth, power consumption, and latency required for chips to communicate over chip-to-chip (C2C) while maintaining memory coherency.

In at least one embodiment, when an interconnect bridge of a chip has received a request (e.g., an eviction request) from a client of the chip to relinquish ownership of a portion of memory (e.g., a cache line), the interconnect bridge may transmit a C2C message corresponding to the same portion of memory (e.g., a read request, a snoop response, etc.) without waiting for an inter-chip completion response for the request. In at least one embodiment, the request may be fully processed without using any inter-chip completion response, thereby reducing latency, power, and IO bandwidth usage in C2C communications. In at least one embodiment, based at least on the C2C message corresponding to the same portion of memory as the request, the interconnect bridge may determine whether the request has already been transmitted to the other chip. Based at least on the determination, the interconnect bridge may transmit the C2C message responsive to or based at least on the request being transmitted to the other chip (the C2C message may push the eviction request to the other chip). The request and the C2C message are transmitted using an ordered communication network such that the other chip receives the C2C message and the request in an order that allows for memory coherency to be maintained.

In further respects, in at least one embodiment, when an interconnect bridge of a chip has provided an inter-chip completion data response for a memory access with ownership permissions update request (e.g., a read unique request) to another chip, the interconnect bridge may provide an internal completion acknowledgement to a client of the chip without waiting for an inter-chip completion acknowledgement from the other chip. In at least one embodiment, the memory access with ownership permissions update request may be fully processed without requiring any inter-chip completion acknowledgement, thereby reducing latency, power, and IO bandwidth usage in C2C communications. To maintain memory coherency, the interconnect bridge may ensure that the inter-chip completion data response is sent out, using an ordered communication network, prior to any subsequently received messages that correspond to the same portion of memory. For example, if the interconnect bridge receives a snoop request from the client, the snoop request may push out the inter-chip completion data response. Additionally, to maintain memory coherency, the interconnect bridge of the other chip may ensure that the subsequently received messages that correspond to the same portion of memory are not provided to the client that issued the memory access with ownership permissions update request until the interconnect bridge has received a corresponding internal completion acknowledgment from the client.

In further respects, in at least one embodiment, an interconnect bridge of a chip may transmit copy back write data with a corresponding copy back request from a client to another chip, rather than first transmitting the copy back request to the other chip and waiting until a corresponding completion database identifier response is received from the other chip to send out the copy back write data. Thus, the latency in processing a copy back request may be reduced and the copy back request and copy back write data may be transmitted C2C using less data. To avoid a snoop hazard, the interconnect bridge may use a snoop response from the client that corresponds to the same portion of memory as the copy back request to push out the copy back write data and copy back request using an ordered communication network such that the interconnect bridge of the other chip is aware of the outstanding copy back request when processing the snoop response.

The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, autonomous or semi-autonomous machine applications, deep learning, environment simulation, object or actor simulation and/or digital twinning, data center processing, conversational AI, light transport simulation (e.g., ray tracing, path tracing, etc.), collaborative content creation for 3D assets, cloud computing, generative AI, (large) language models, and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, systems for performing generative AI operations, systems for performing operations using a large language model, and/or other types of systems.

With reference to FIG. 1A, FIG. 1A includes a data flow diagram for an example of a process 100 for processing an eviction request using chip-to-chip communications without using an inter-chip completion response, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example computing device 600 of FIG. 6, and/or example data center 700 of FIG. 7.

The process 100 may be performed using one or more chips, such as a chip(s) 110A and a chip(s) 110B, which may communicate using an ordered communication network 102. Examples of the chips 110A or 110B include one or more of one or more Central Processing Units (CPUs), one or more Graphics Processing Units (GPUs), one or more Field Programmable Gate Arrays (FPGAs), one or more Application-Specific Integrated Circuits (ASICs), one or more memory devices, one or more Network Interface Cards (NICs), one or more Digital Signal processors (DSPs), one or more processors, one or more Machine Learning (ML) accelerators, one or more physical chips, one or more virtual chips, one or more systems-on-chip (SoCs), one or more of the logic unit(s) 620, and/or other types of chips.

The chips 110A and 110B may be configured to communicate with one another over the ordered communication network 102 using chip-to-chip (C2C) communications. In at least one embodiment, the ordered communication network 102 includes any suitable communication network capable of being used while ensuring that messages that are transmitted from one chip, such as the chip 110A are received and/or processed by another chip, such as the chip 110B, in a designated order, such as the order in which they are transmitted from the chip. Various approaches may be used to implement the ordered communication network 102. In at least one embodiment, the ordered communication network 102 is implemented using an ordered communication fabric, for example, using a point-to-point connection(s) between the chips 110A and 110B. Additionally, or alternatively, the ordered communication network 102 may be implemented based at least on associating sequence numbers with the messages. For example, the sequence numbers may be used to reconstruct the order in which the messages are to be processed and/or were transmitted. In at least one embodiment, the chip that transmits the messages determines and/or defines the order in which the messages are to be received and/or processed by the one or more other chips.

In addition to or alternatively from including a point-to-point connection(s) between the chips 110A and 110B, the ordered communication network 102 may include various other components between the chips 110A and 110B, such as one or more intermediate devices and/or connections, such as one or more chips, switches, repeaters, signal conditioners, and/or multiplexers.

In at least one embodiment, the chips 110A and 110B may be configured to communicate with one another over the ordered communication network 102 using one or more C2C communications protocols, examples of which include Advanced Microcontroller Bus Architecture-Coherent Hub Interface (AMBA-CHI) protocol, QuickPath Interconnect (QPI) protocol, HyperTransport (HT) protocol, Common System Interface (CSI) protocol, cache coherent interconnect for accelerators (CCIX) protocol, and/or Open Coherent Accelerator Processor Interface (OpenCAPI) protocol.

As shown in FIG. 1A, the chips 110A and 110B may include various nodes, which may facilitate communications between the chips 110A and 110B. For example, the chip(s) 110A is shown as including an agent(s) 112A and an interconnect bridge(s) 114A, which may be referred to as a bridge for brevity. Similarly, the chip(s) 110B is shown as including an agent(s) 112B and an interconnect bridge(s) 114B, which may also be referred to as a bridge for brevity.

Examples of the agents 112A or 112B include one or more hardware and/or software components or entities that can receive or respond to transactions using the C2C interface. An agent 112A or 112B may include one or more processors, one or more processing units, one or more memory controllers, one or more peripheral devices, or any other component that communicates with other components in the system. In at least one embodiment, the agents 112A or 112B may include clients that can initiate transactions on the C2C interface.

The bridges 114A and 114B may provide one or more paths for communication between the agents 112A and 112B while maintaining the coherence of shared data in the system. In at least one embodiment, each of the bridges 114A or 114B may function as a switch or a router that enables the transfer of data between the agents 112A and 112B. In at least one embodiment, the bridges 114A and 114B may implement at least some of the coherency rules and/or features of one or more C2C communications protocols used to implement the C2C communications. In at least one embodiment, the bridges 114A and 114B may handle the routing of transactions between the agents 112A and 112B based at least on examining transaction attributes, such as the transaction type, source and destination IDs, and corresponding coherence information.

In at least one embodiment, the chips 110A and 110B may be configured to communicate with one another over the ordered communication network 102 using one or more C2C communications protocols. In at least one embodiment, the one or more C2C communication protocols may not require an ordered communication network to maintain coherency between different nodes of the system. For example, the one or more C2C communication protocols may include coherency rules that provide coherency even when chips communicate using an unordered communication network. By way of example, and not limitation, the AMBA-CHI protocol can be used with an unordered communication network while maintaining coherency between different nodes of the system. For example, the AMBA-CHI protocol includes various coherency traffic rules and/or features to address situations where certain messages may be received in different orders depending on different circumstances. These features may include inter-chip messages, such as completion responses and/or acknowledgements for requests and/or one or more corresponding processing steps or stages. In accordance with various aspects of the disclosure, using the ordered communication network 102, protocol-level coherency traffic rules and/or features may be relaxed and/or eliminated while maintaining coherency and reducing IO bandwidth usage between chips.

As indicated in FIG. 1A, the process 100 may include the agent(s) 112A initiating and/or providing an eviction request 120 to the bridge(s) 114A. An eviction request may refer to a form of request to relinquish ownership of a portion of memory, such as a cache line(s), accessible to multiple agents in the system. For example, the agent 112A may initiate the eviction request 120 to relinquish ownership of a portion of memory owned by the agent 112A. While particular requests, responses, and/or acknowledgements are described with respect to the chips 110A and 110B herein, they may be effectuated using one or more corresponding messages and/or packets.

The process 100 may further include the bridge(s) 114A of the chip 110A receiving the eviction request 120 and providing the eviction request 120 from the chip 110A to the chip 110B using the inter-chip eviction request 126. Based at least on the bridge(s) 114A of the chip 110A propagating the eviction request 120 to the chip 110B using the inter-chip eviction request 126, the bridge(s) 114A may provide a completion response 122 (an internal completion response) to the agent 112A.

The process 100 may further include the agent(s) 112A receiving the completion response 122 from the bridge 114A. Based at least on the agent 112A receiving the completion response 122, the agent(s) 112A may initiate and/or transmit one or more subsequent coherence messages corresponding to the same portion of memory as the eviction request 120. For example, in at least one embodiment, the agent 112A is configured to wait until a completion response for a cache line is received—for an eviction request that is to relinquish ownership of the cache line-prior to initiating and/or transmitting a subsequent coherence message(s) or type of coherence message(s) corresponding to the cache line. This approach can prevent the risk of the subsequent message being received and/or processed by the bridge 114B of the chip 110B out-of-order with the eviction request 120, thereby maintaining coherency. In the example of FIG. 1A, the coherence message(s) includes a memory access request (e.g., corresponding to the inter-chip read request 128) and in the example of FIGS. 1B and 1C, the coherence message(s) includes a snoop response (e.g., corresponding to the inter-chip snoop response 156). A coherence message may refer to a message of a coherence transaction, where a coherence transaction may include one or more coherence messages exchanged between agents to ensure the consistency of shared data.

Typically, a C2C protocol, such as AMBA-CHI, may require the chip 110B to send an inter-chip completion response for the inter-chip eviction request 126 to the chip 110A. The bridge 114A of the chip 110A may wait to send out any coherence messages that correspond to the portion of memory being relinquished using the inter-chip eviction request 126, until the inter-chip completion response is received for that portion of memory. This approach can prevent the subsequent coherence message(s) from being received and/or processed by the bridge 114B out-of-order with the inter-chip eviction request 126 when using an unordered communication network, thereby maintaining coherency. However, inter-chip coherence responses can consume significant IO bandwidth between the chips 110A and 110B, while increasing latency and power consumption.

In accordance with one or more aspects of the present disclosure, the subsequent coherence message(s), such as the read request 124 or the snoop response 166 can be prevented from being received and/or processed by the bridge 114B out-of-order without requiring a corresponding inter-chip completion response to maintain coherency. In at least one embodiment, the bridge 114A of the chip 110A can use the ordered communication network 102 to ensure that the subsequent coherence message(s) and the inter-chip eviction request 126 are processed in-order by the bridge 114B of the chip 110B. In at least one embodiment, based at least on the subsequent coherence message(s) received by the bridge 114A corresponding to a same portion of memory as the eviction request 120 received by the bridge 114A, the bridge 114A may perform a verification 134 to determine whether the eviction request 120 has been transmitted to the chip 110B using the ordered communication network 102. Rather than waiting for an inter-chip completion response to be received from the chip 110B, responsive to or based at least on the eviction request 120 being transmitted to the chip 110B using the ordered communication network 102, the bridge 114A may transmit the coherence message(s) to the chip 110B using the ordered communication network 102. Thus, using disclosed approaches, an eviction corresponding to the eviction request 120 may be effectively completed without the bridge 114A having to wait for a response (e.g., a completion response), and the eviction may be referred to as a posted eviction accordingly.

In at least one embodiment, the verification 134 includes the bridge 114A determining the coherence message(s) and the eviction request 120 correspond to a same portion of memory (e.g., one or more at least partially overlapping memory portions). In at least one embodiment, the bridge 114A performs the verification using one or more data structures that track the state of ownership of memory and/or received requests and corresponding memory portions. For example, the bridge 114A may perform the verification 134 and/or any of the other various verifications or determinations described herein using the one or more data structures. In at least one embodiment, the data structures may include one or more probe filters or directories. A directory may be used to maintain the coherence state of cache lines. In at least one embodiment, a table may include a set of entries, where each entry may correspond to a cache line and include information about which agents have a copy of that line, and whether the copies are valid or stale. In at least one embodiment, a probe filter may be used by the bridge 114A to determine which agents need to be informed of a cache line eviction. By way of example, and not limitation, a probe filter may be implemented as a bit vector or bitmask, where each bit corresponds to an agent and indicates whether that agent has a copy of the cache line.

In at least one embodiment, the bridge 114A receiving a subsequent internal coherence message(s) for a portion of memory may push a pending eviction request 120 that corresponds to the portion of memory to the chip 110B, as indicated by an arrow of the verification 134. For example, if the verification 134 indicates a corresponding eviction request has not yet been sent out over the ordered communication network 102, the verification 134 may cause the bridge 114A to send out both the eviction request 120 and the read request 124. The eviction request 120 may be sent out first or may otherwise be sent to ensure the inter-chip eviction request 126 will be processed by the bridge 114B prior to an inter-chip read request 128 that corresponds to the read request 124.

In at least one embodiment, the process 100 includes the bridge(s) 114B of the chip 110B receiving the inter-chip eviction request 126 and providing the inter-chip eviction request 126 from the chip 110A to the agent 112B using an eviction request 140. Based at least on the bridge(s) 114B of the chip 110B propagating the inter-chip eviction request 126 to the agent 112B using the eviction request 140, the agent(s) 112B provides a completion response 142 (an internal completion response) to the bridge 114B.

The process 100 may further include the bridge(s) 114B receiving the completion response 142 from the agent 112B. Based at least on the bridge 114B receiving the completion response 142, the bridge(s) 114B may propagate one or more subsequent coherence messages corresponding to the same portion of memory as the inter-chip eviction request 126 to the agent 112B. For example, in at least one embodiment, the bridge 114B is configured to wait until a completion response for a cache line is received from the agent 112B—for an eviction request that is to relinquish ownership of the cache line-prior to transmitting a subsequent coherence message(s) or type of coherence message(s) corresponding to the cache line to the agent 112B. This approach can prevent the risk of the subsequent message being received and/or processed by the agent 112B of the chip 110B out-of-order with the eviction request 140, thereby maintaining coherency. In the example of FIG. 1A, the coherence message(s) includes a read request 130 corresponding to the inter-chip read request 128.

In at least one embodiment, based at least on the subsequent coherence message(s) received by the bridge 114B corresponding to a same portion of memory as the inter-chip eviction request 126 received by the bridge 114B, the bridge 114B may perform a verification 132 to determine whether the eviction request 140 for an outstanding inter-chip eviction request 126 has been transmitted to the agent 112B. The verification 132 may be performed such that the inter-chip read request 128 pushes an outstanding inter-chip eviction request 126 to the agent 122B using the eviction request 140. Further, based at least on the eviction request 140 being sent to the agent 112B, the bridge 114B may perform a verification 136 determine whether a completion response 142 for the eviction request 140 has been received from the agent 112B. The verification 136 may be performed such that the completion response 142 pushes an outstanding inter-chip read request 128 to the agent 112B using the read request 130, thereby maintaining coherency for the read request or other coherence message.

Figure 1B:
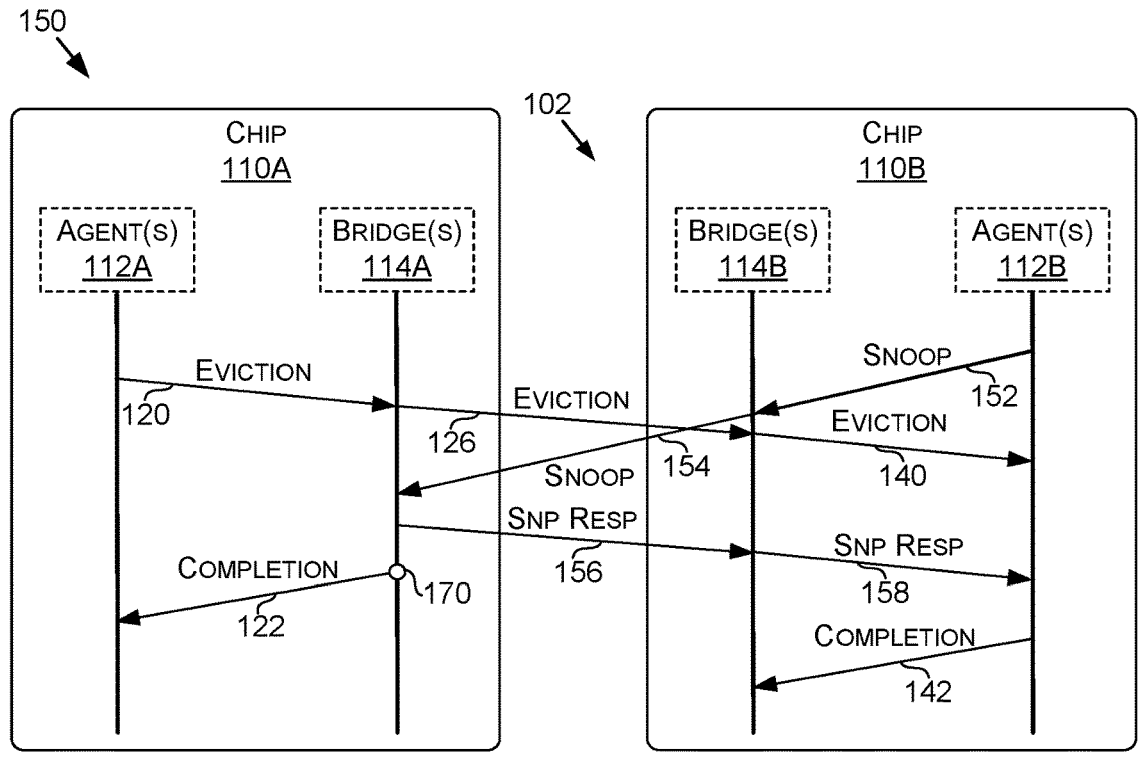
FIG. 1B includes a data flow diagram for an example of a process for processing an eviction request using chip-to-chip communications without an inter-chip completion response while avoiding a snoop hazard, in accordance with some embodiments of the present disclosure.

Referring now to FIG. 1B, FIG. 1B includes a data flow diagram for an example of a process 150 for processing an eviction request using chip-to-chip communications without an inter-chip completion response while avoiding a snoop hazard, in accordance with some embodiments of the present disclosure. The process 150, which may correspond to the process 100 of FIG. 1A, includes the agent 112B transmitting a snoop request 152 corresponding the same portion of memory as the eviction request 120, such as the same cache line, to the bridge 114B. A snoop request, such as a snoop request 152, may be sent to inform other agents of a memory access operation that may affect their cached copies of an accessed memory location so as to maintain coherence and consistency of data. The other agents may have a copy of the same memory location in their local caches and the snoop request 152 may be used to inform the other agents that the memory location is being accessed and to take appropriate action to ensure coherence and consistency of data.

The process 150 also includes the bridge 114B receiving the snoop request 152 from the agent 112B. Based at least on the bridge 114B receiving the snoop request 152 prior to the inter-chip eviction request 126, the bridge 114B may propagate the snoop request 152 to the chip 110A using an inter-chip snoop request 154. For example, the bridge 114B may determine or detect the agent 112A on the chip 110A owns the portion of memory corresponding to the snoop request 152 and forward the snoop request 152 accordingly.

Conventionally, an inter-chip completion response from the chip 110B (e.g., as described with respect to FIG. 1A) causes deallocation of the portion of memory at the chip 110A, such that the bridge 114A can continue operations corresponding to the portion of memory. In at least one embodiment, sending the completion response 122 to the agent 112A that issued the eviction request 120 may trigger a deallocation 170 of the portion of memory. Thus, the portion of memory may be deallocated significantly faster, as the bridge 114A need not wait for the inter-chip completion response.

Further, in at least one embodiment, based at least on receiving the inter-chip snoop request 154, the bridge 114A may determine the inter-chip snoop request 154 corresponds to a same portion of memory as the eviction request 120. Additionally, based at least on receiving the inter-chip snoop request 154, the bridge 114A may determine the bridge 114A has not yet provided the completion response 122 to the agent 112A for the eviction request 120. Based at least on the determination(s), the bridge 114A may generate and transmit a snoop response 156 to the chip 110B indicating the agent 112A has relinquished ownership of the portion of memory. Thus, rather than requesting a snoop response from the agent 112A for propagation to the chip 110B, the bridge 114A can generate and transmit the snoop response 156, thereby reducing latency while maintaining coherence.

Figure 1C:
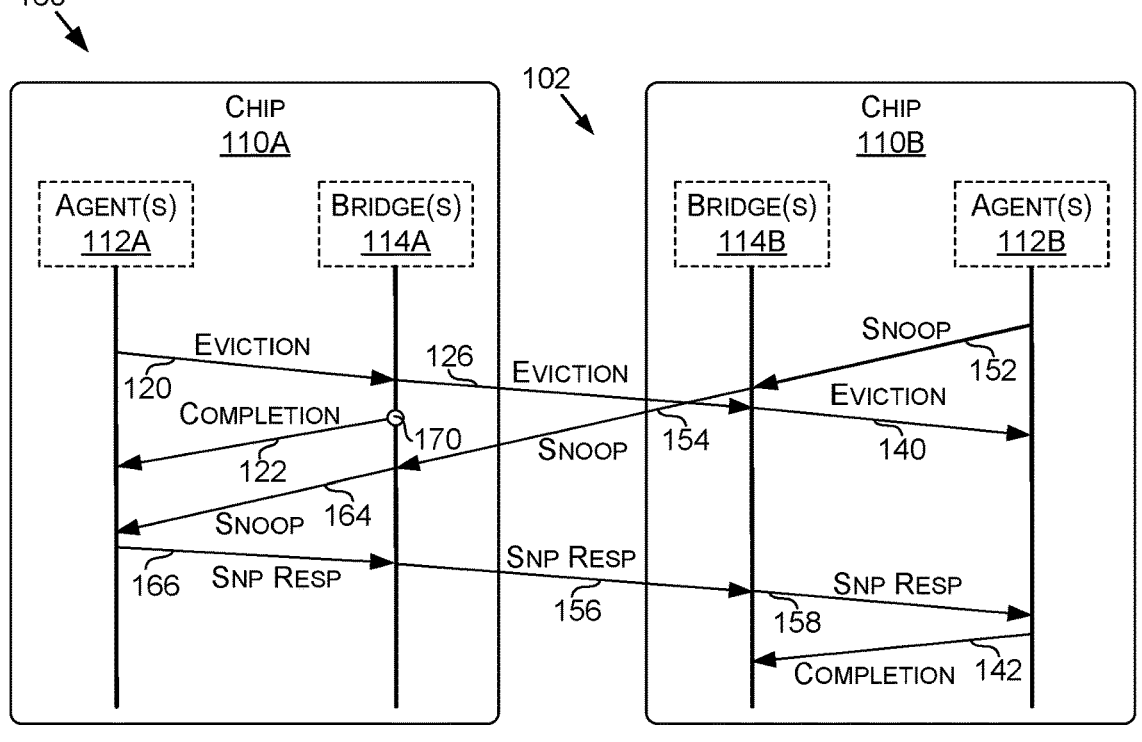
FIG. 1C includes another data flow diagram for an example of a process for processing an eviction request using chip-to-chip communications without an inter-chip completion response while avoiding a snoop hazard, in accordance with some embodiments of the present disclosure.

Referring now to FIG. 1C, FIG. 1C includes a data flow diagram for an example of a process 160 for processing an eviction request using chip-to-chip communications without an inter-chip completion response while avoiding a snoop hazard, in accordance with some embodiments of the present disclosure. As in the process 150 of FIG. 1B, based at least on receiving the inter-chip snoop request 154, the bridge 114A may determine the inter-chip snoop request 154 corresponds to a same portion of memory as the eviction request 120. In contrast to the process 150 of FIG. 1B, the process 160 may include based at least on receiving the inter-chip snoop request 154, the bridge 114A determining the bridge 114A has already provided the completion response 122 to the agent 112A for the eviction request 120. Based at least on the determination(s), the bridge 114A may propagate the inter-chip snoop request 154 to the agent 112A using a snoop request 164. The agent 112A may generate and transmit a snoop response 166 to the bridge 114A responsive to or based at least on the snoop request 164. The bridge 114A may then propagate the snoop response 166 to the chip 110B using the inter-chip snoop response 156. In particular, because the bridge 114A has already provided the completion response 122 to the agent 112A in the process 160, the status of the portion of memory may have changed. To ensure the status is current, the bridge 114A queries the agent 112A using the snoop request 164, thereby avoiding a snoop hazard.

An example of a snoop response includes an indication that the requested data or cache line is present in the client's cache and is in a valid state, so no further action is required. Another example of a snoop response includes that the requested data is present in the client's cache, and the client can provide the data to the requester. Another example of a snoop response includes an indication that the requested data or cache line is not present in the client's cache, but it has been evicted from the cache in a clean state so that the requester can fetch the data from main memory. Another example of a snoop response includes an indication that the requested data or cache line is present in the client's cache, but it has been modified by the requester or another client. As a result, the client may invalidate the cache line to ensure data coherence. A further example of a snoop response includes an indication that the requested data or cache line is present in the client's cache, but it is not exclusively owned by the requester. As a result, the client may upgrade the cache line to a "read-unique" state to ensure data coherence.

Figure 2:
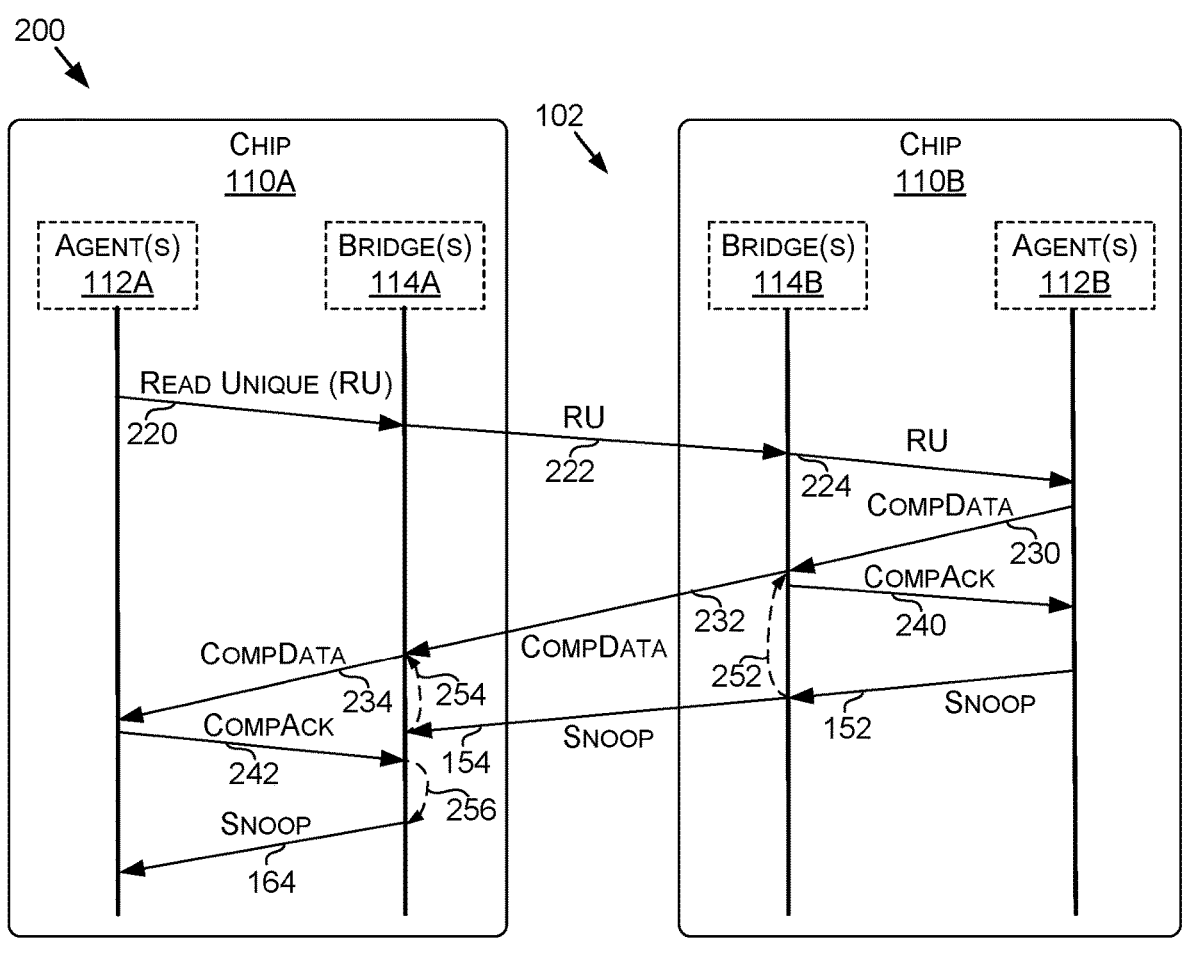
FIG. 2 includes a data flow diagram for an example of a process for processing a memory access with ownership permissions update request using chip-to-chip communications without using a completion acknowledgement, in accordance with some embodiments of the present disclosure.

Referring now to FIG. 2, FIG. 2 includes a data flow diagram for an example of a process 200 for processing a memory access with ownership permissions update request using chip-to-chip communications without using a completion acknowledgement, in accordance with some embodiments of the present disclosure. A memory access with ownership permissions update request, such as a Read Once with Update Permission (ROwUP) or a Read Unique (RU), may involve a memory access to a portion of memory with an update to permissions of the portion of memory, for example, to grant the requester ownership of the portion of memory.

The process 200 may include the agent 112A transmitting a memory access with ownership permissions update request, such as a read unique (RU) request 220 corresponding to a portion of memory to the bridge 114A. The bridge 114A may receive the RU request 220 from the agent 112A and propagate the RU request 220 to the chip 110B using an inter-chip RU request 222 corresponding to the portion of memory. The process 200 may further include the bridge 114B of the chip 110B receiving the inter-chip RU request 222 and propagating the inter-chip RU request 222 to the agent 112B using an RU request 224 corresponding to the portion of memory. The agent 112B may receive the RU request 224 and responsive to or based at least on the RU request 224 transmit a completion data response 230 corresponding to the portion of memory to the bridge 114B. In at least one embodiment, the completion data response 230 includes data read from the portion of memory responsive to or based at least on the RU request.

In at least one embodiment, the bridge 114B receives the completion data response 230 from the agent 112B and propagates the completion data response 230 to the chip 110A using an inter-chip completion data response 232.

Conventionally, a memory access with ownership permissions update request may be accomplished using an inter-chip completion acknowledgement that is sent by the bridge 114A to the chip 110B responsive to or based at least on the bridge 114A receiving the inter-chip completion data response 232. The bridge 114B of the chip 110B then propagates the inter-chip completion acknowledgement to the agent 112B using an internal completion acknowledgement. The agent 112B will wait until it receives the internal completion acknowledgement that corresponds to the completion data response 230 to process or provide requests corresponding to the cache line. For example, the agent 112B may stall processing or providing any subsequent snoop requests for the cache line until the internal completion acknowledgement is received. As the internal completion acknowledgement corresponds to the inter-chip completion acknowledgement, latency is introduced along with IO bandwidth consumption.

In accordance with one or more embodiments of the present disclosure, the bridge 114B may provide a completion acknowledgement 240 to the agent 112B without waiting for an inter-chip completion acknowledgement from the chip 110A. For example, the bridge 114B may provide a completion acknowledgement 240 to the agent 112B responsive to or based at least on transmitting the corresponding inter-chip completion data response 232 to the chip 110A. Thus, the agent 112B can process or provide requests corresponding to the cache line without requiring an inter-chip completion acknowledgement.

In at least one embodiment, to maintain coherency for the cache line, based at least on receiving a request, such as the snoop request 152, corresponding to a same portion of memory as the inter-chip RU request 222, the bridge 114B may perform a verification 252 to determine whether the inter-chip completion data response 232 for an outstanding inter-chip RU request 222 has been transmitted to the chip 110A. The verification 252 may be performed such that the snoop request 152 (or other request type) pushes an outstanding inter-chip completion data response 232 to the chip 110A (after the completion data response 230 is received). For example, if the verification 252 indicates a corresponding inter-chip completion data response 232 has not yet been sent out over the ordered communication network 102, the verification 252 may cause the bridge 114B to send out both the inter-chip completion data response 232 and the snoop request 152. The inter-chip completion data response 232 may be sent out first or may otherwise be sent to ensure the inter-chip completion data response 232 will be processed by the bridge 114A prior to the inter-chip snoop request 154 that corresponds to the snoop request 152.

Additionally, to maintain coherency for the cache line, based at least on receiving an inter-chip request, such as the inter-chip snoop request 154, corresponding to a same portion of memory as the inter-chip RU request 222, the bridge 114A may perform a verification 254 to determine whether a completion data response 234 for an outstanding inter-chip RU request 222 has been transmitted to the agent 112A. The verification 254 may be performed such that the inter-chip snoop request 154 (or other request type) pushes an outstanding completion data response 234 to the agent 112A (after the inter-chip completion data response 232 is received). For example, if the verification 254 indicates a corresponding completion data response 234 has not yet been sent to the agent 112A, the verification 254 may cause the bridge 114A to send the completion data response 234 to the agent 112A.

Further, to maintain coherency for the cache line, the bridge 114A may wait to provide the inter-chip snoop request 154 and/or other requests corresponding to the cache line to the agent 112A until a completion acknowledgement 242 corresponding to the completion data response 234 is received. Upon receiving the completion acknowledgement 242, the bridge 114A may perform a verification 256 on whether there are any outstanding requests that correspond to the cache line to provide to the agent 112A. The verification 256 may be performed such that the completion acknowledgement 242 pushes the outstanding snoop request 164 (and/or other requests) to the agent 112A (after the inter-chip snoop request 154 is received). Thus, the process 200 can maintain coherency for the cache line without requiring the use of any corresponding inter-chip completion acknowledgement.

Figure 3A:
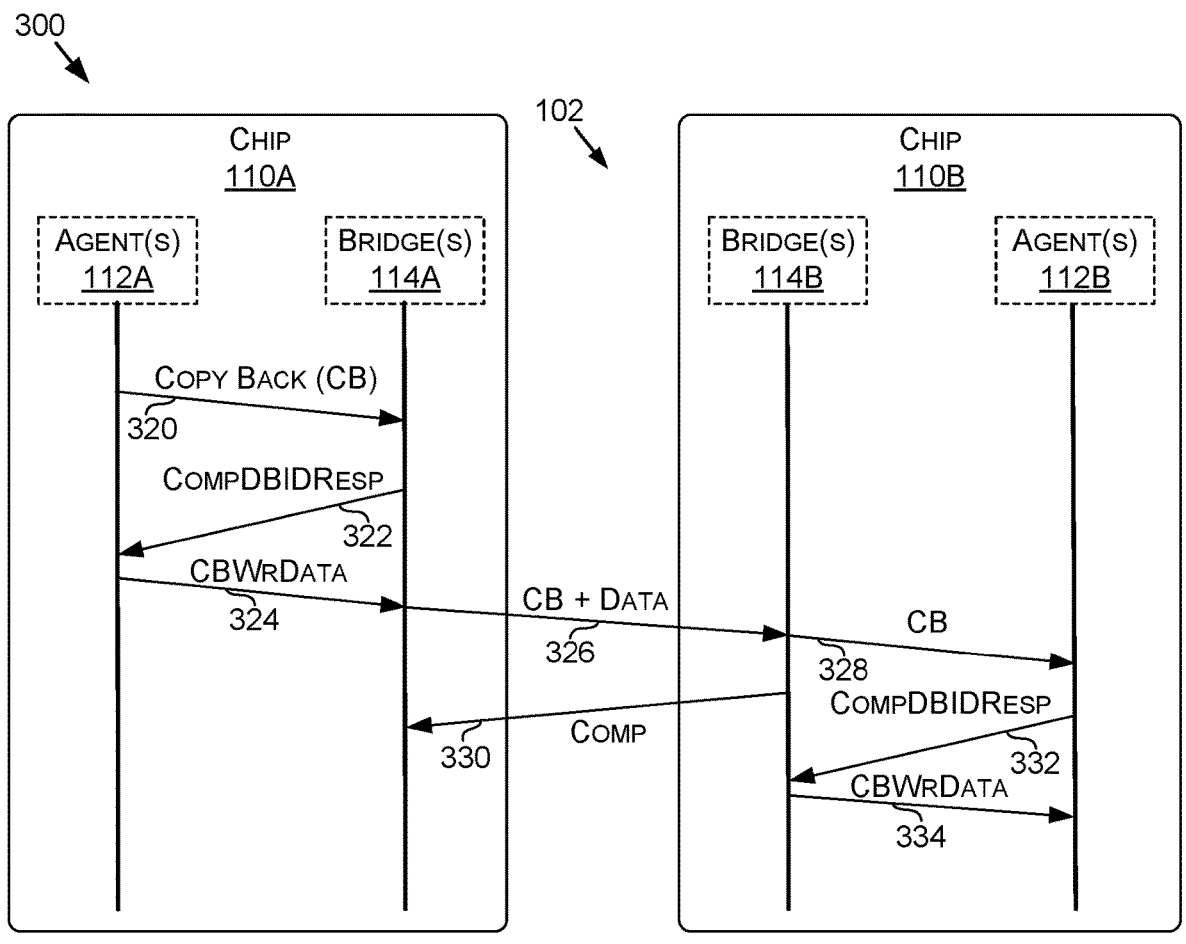
FIG. 3A includes a data flow diagram for an example of a process for transmitting write data with a copy back request using chip-to-chip communications, in accordance with some embodiments of the present disclosure.

Referring now to FIG. 3A, FIG. 3A includes a data flow diagram for an example of a process 300 for transmitting write data with a copy back request using chip-to-chip communications, in accordance with some embodiments of the present disclosure. A copy back request may involve updating a portion of memory with modified data. When an entity that owns the portion of memory (e.g., a cache line) is to write data to a memory location that is stored in another component (e.g., a cache memory), the entity may need to ensure that the portion of memory is updated correctly to maintain coherence across the system.

The process 300 may include the agent 112A transmitting a copy back request 320 corresponding to a portion of memory (e.g., owned by the agent 112A) to the bridge 114A. Based at least on receiving the copy back request 320, the bridge 114A may provide a corresponding completion database identifier response (CompDBIDResp) 322 to the agent 112A. Based at least on receiving the CompDBIDResp 322, the agent 112A may provide copy back write data (CBWrData) 324 to the bridge 114A. Based at least on receiving the CBWrData 324 from the agent 112A, the bridge 114A may propagate both the CBWrData 324 and the copy back request 320 to the chip 110B using inter-chip copy back request+data message(s) 326.

Also in the process 300, the bridge 114B of the chip 110B may receive the inter-chip copy back request+data message(s) 326. Based at least on receiving the inter-chip copy back request+data message(s) 326, the bridge 114B may provide a corresponding copy back request 328 to the agent 112B. Further, based at least on receiving the inter-chip copy back request+data message(s) 326, the bridge 114B may provide a completion response 330 to the chip 110A. Based at least on receiving the copy back request 328, the agent 112B may provide a corresponding CompDBIDResp 332 to the bridge 114A. Based at least on receiving the CompDBIDResp 332 that corresponds to the copy back request 320, the bridge 114B may provide CBWrData 334 to the agent 112B, where the CBWrData 334 include the CBWrData 324 from the inter-chip copy back request+data message(s) 326.

Conventionally, the bridge 114A may provide the copy back request 320 to the chip 110B using an inter-chip copy back request and cannot send the corresponding copy back write data to the chip 110B until the bridge 114A receives a corresponding completion database identifier response (CompDBIDResp) from the chip 110B. This approach may be used to control how the copy back write data, the inter-chip copy back request, and other requests, such as snoop requests, are exchanged and processed between chips so that the messages are received and/or processed to the ensure memory coherency, even where an unordered communication network is used. As an example, the inter-chip CompDBIDResp may indicate the agent 112B has received the inter-chip copy back request and is able to process the inter-chip copy back request so that the write data and snoop response corresponding to the same portion of memory is properly handled by the bridge 114A and the bridge 114B.

In accordance with one or more embodiments of the present disclosure, the inter-chip copy back request+data message(s) 326 may be used so that separate messages are not required to transmit the copy back request and the copy back write data to the chip 110A. Using disclosed approaches, the amount of data may be reduced, for example, by reducing the amount of header data that needs to be exchanged between the chips 110A and 110B. For example, the header data for the copy back write data need not identify the corresponding copy back request. Additionally, or alternatively, the inter-chip copy back request+data message(s) 326 may be used so that the chip 110A need not wait for a corresponding CompDBIDResp from the chip 110B prior to sending the copy back write data to the chip 110B. Thus, the latency in processing a copy back request may be reduced.

Figure 3B:
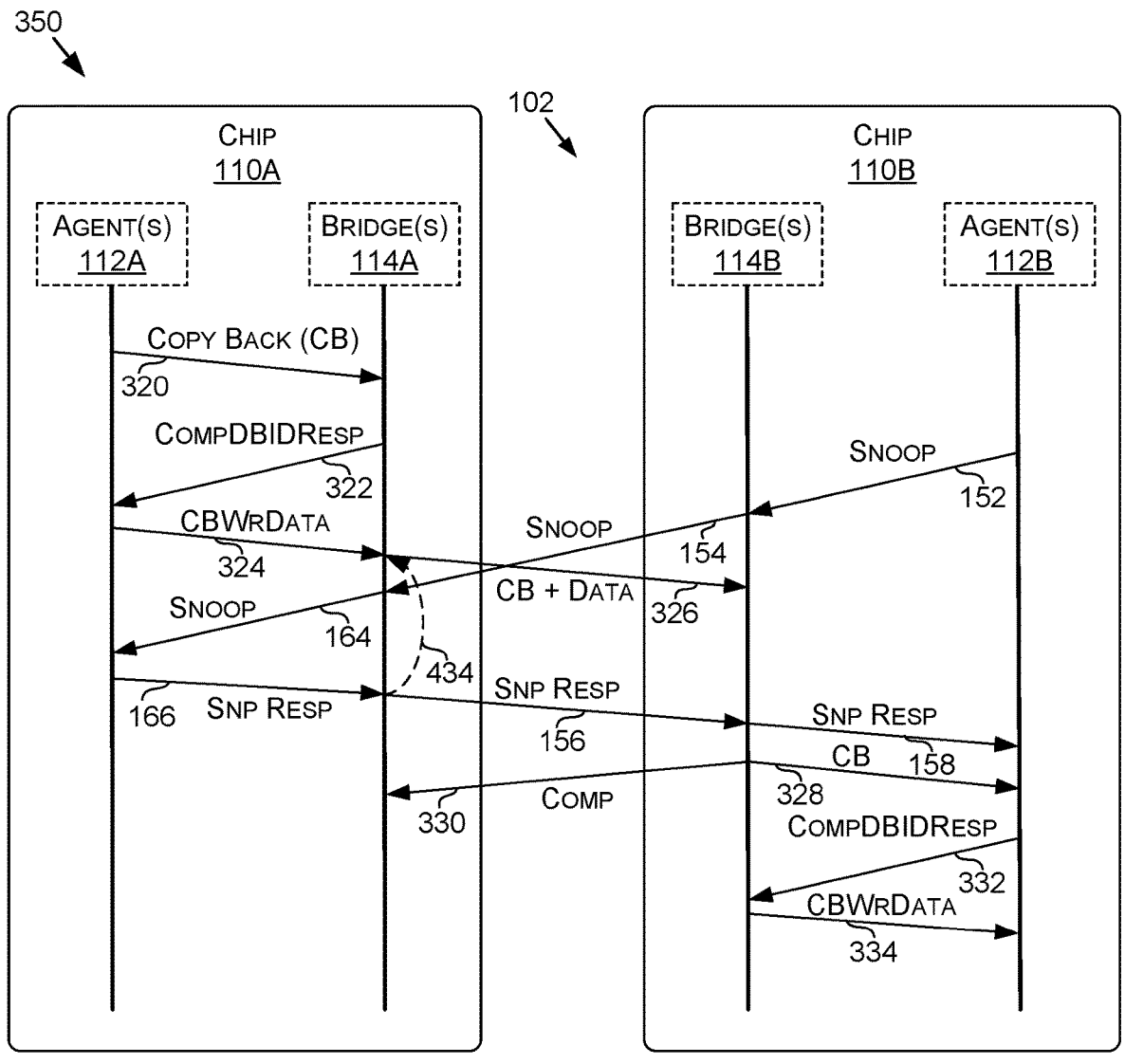
FIG. 3B includes a data flow diagram for an example of a process for transmitting write data with a copy back request using chip-to-chip communications while avoiding a snoop hazard, in accordance with some embodiments of the present disclosure.

Referring now to FIG. 3B, FIG. 3B includes a data flow diagram for an example of a process 350 for transmitting write data with a copy back request using chip-to-chip communications while avoiding a snoop hazard, in accordance with some embodiments of the present disclosure. The process 350, which may correspond to the process 300 of FIG. 3A, includes the agent 112B transmitting the snoop request 152 corresponding the same portion of memory as the copy back request 320, such as the same cache line, to the bridge 114B.

The process 350 also includes the bridge 114B receiving the snoop request 152 from the agent 112B. The bridge 114B may propagate the snoop request 152 to the chip 110A using the inter-chip snoop request 154. For example, the bridge 114B may determine or detect the agent 112A on the chip 110A owns the portion of memory corresponding to the snoop request 152 and forward the snoop request 152 accordingly. Based at least on receiving the inter-chip snoop request 154, the bridge 114A may propagate the inter-chip snoop request 154 to the agent 112A using the snoop request 164. The agent 112A may generate and transmit a snoop response 166 to the bridge 114A responsive to or based at least on the snoop request 164. The bridge 114A may then propagate the snoop response 166 to the chip 110B using the inter-chip snoop response 156.

In at least one embodiment, to avoid a snoop hazard, based at least on the bridge 114A determining the snoop response 166 corresponds to a same portion of memory as copy back request 320 received by the bridge 114A, the bridge 114A may perform a verification 434 to determine whether the inter-chip copy back request+data message(s) 326 for the outstanding copy back request 320 has been transmitted to the chip 110B. The verification 434 may be performed such that the snoop response 166 pushes an outstanding inter-chip copy back request+data message(s) 326 to the chip 110B using the CBWrData 324 (after the CBWrData 324 is received). For example, if the verification 434 indicates a corresponding inter-chip copy back request+ data message(s) 326 has not yet been sent out over the ordered communication network 102, the verification 434 may cause the bridge 114A to send out both the inter-chip copy back request+data message(s) 326 and the snoop response 156. The inter-chip copy back request+data message(s) 326 may be sent out first or may otherwise be sent to ensure the inter-chip copy back request+data message(s) 326 will be received by the bridge 114B prior to the inter-chip snoop response 156 that corresponds to the snoop response 166. Thus, the bridge 114A can ensure that the bridge 114B is aware of the outstanding copy back request 320 when it processes the inter-chip snoop response 156. For example, if the snoop response 166 is provided by the agent 112A after the CBWrData 324, the bridge 114B can properly store data from the snoop response 166 in the portion of memory so that it remains after the agent 112B process the CBWrData 334.

Figure 5:
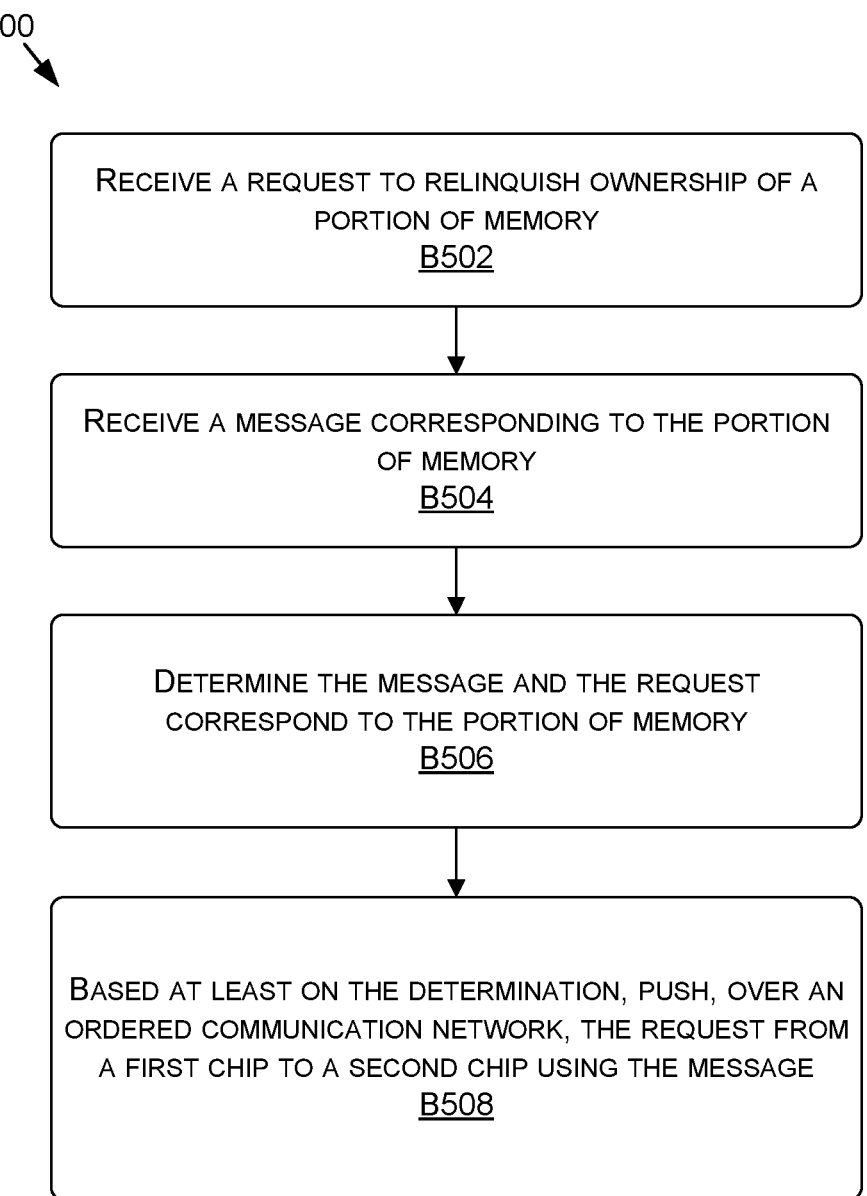
FIG. 5 is a flow diagram showing a method for processing a request to relinquish ownership of a portion of memory using an ordered communication network, in accordance with some embodiments of the present disclosure.

Now referring to FIG. 4 and FIG. 5, each block of methods 400 and 500 (and other methods), described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, methods are described, by way of example, with respect to particular components. However, the methods may additionally or alternatively be executed by any one system, or any combination of systems, including, but not limited to, those described herein.

FIG. 4 is a flow diagram showing a method for processing an eviction request using an ordered communication network, in accordance with some embodiments of the present disclosure. The method 400, at block B402, includes receiving an eviction request from an agent of a first chip. For example, the bridge 114A of the chip 110A may receive the eviction request 120 from the agent 112A (a client) of the chip 110A.

At block B404, the method 400 includes receiving a message of a transaction. For example, the bridge 114A of the chip 110A may receive the read request 124 from the agent 112A of the chip 110A.

At block B406, the method 400 includes determining whether the eviction request has been transmitted to a second chip using an ordered communication network. For example, the bridge 114A of the chip 110A may, based at least on the read request 124 corresponding to a same cache line as the eviction request 120 (e.g., and a different transaction), determining whether the eviction request 120 has been transmitted to the chip 110B using the ordered communication network 102 between the chip 110A and the chip 110B.

At block B408, the method 400 includes responsive to or based at least on the eviction request being transmitted to the second chip using the ordered communication network, transmitting the message to the second chip using the ordered communication network. For example, based at least on the determining and responsive to or based at least on the eviction request 120 being transmitted to the chip 110B using the ordered communication network 102, the bridge 114A of the chip 110A may transmit the read request 124 to the chip 110B using the ordered communication network 102.

FIG. 5 is a flow diagram showing a method for processing a request to relinquish ownership of a portion of memory using an ordered communication network, in accordance with some embodiments of the present disclosure. The method 500, at block B502, includes receiving a request to relinquish ownership of a portion of memory. For example, the bridge 114A of the chip 110A may receive the eviction request 120 from the agent 112A (a client) of the chip 110A.

At block B504, the method 500 includes receiving a message corresponding to the portion of memory. For example, the bridge 114A of the chip 110A may receive the read request 124 from the agent 112A of the chip 110A.

At block B506, the method 500 includes determining the message and the request to relinquish ownership correspond to the portion of memory. For example, the bridge 114A of the chip 110A may determine the read request 124 and the eviction request 120 correspond to the portion of memory.

At block B508, the method 500 includes responsive to or based at least on the determination, pushing, over an ordered communication network, the request to relinquish ownership of the portion of memory to a second chip using the message. For example, based at least on the determination, the bridge 114A of the chip 110A may push, over the ordered communication network 102, the eviction request 120 to the chip 110B using the read request 124.

Example Computing Device

Figure 6:
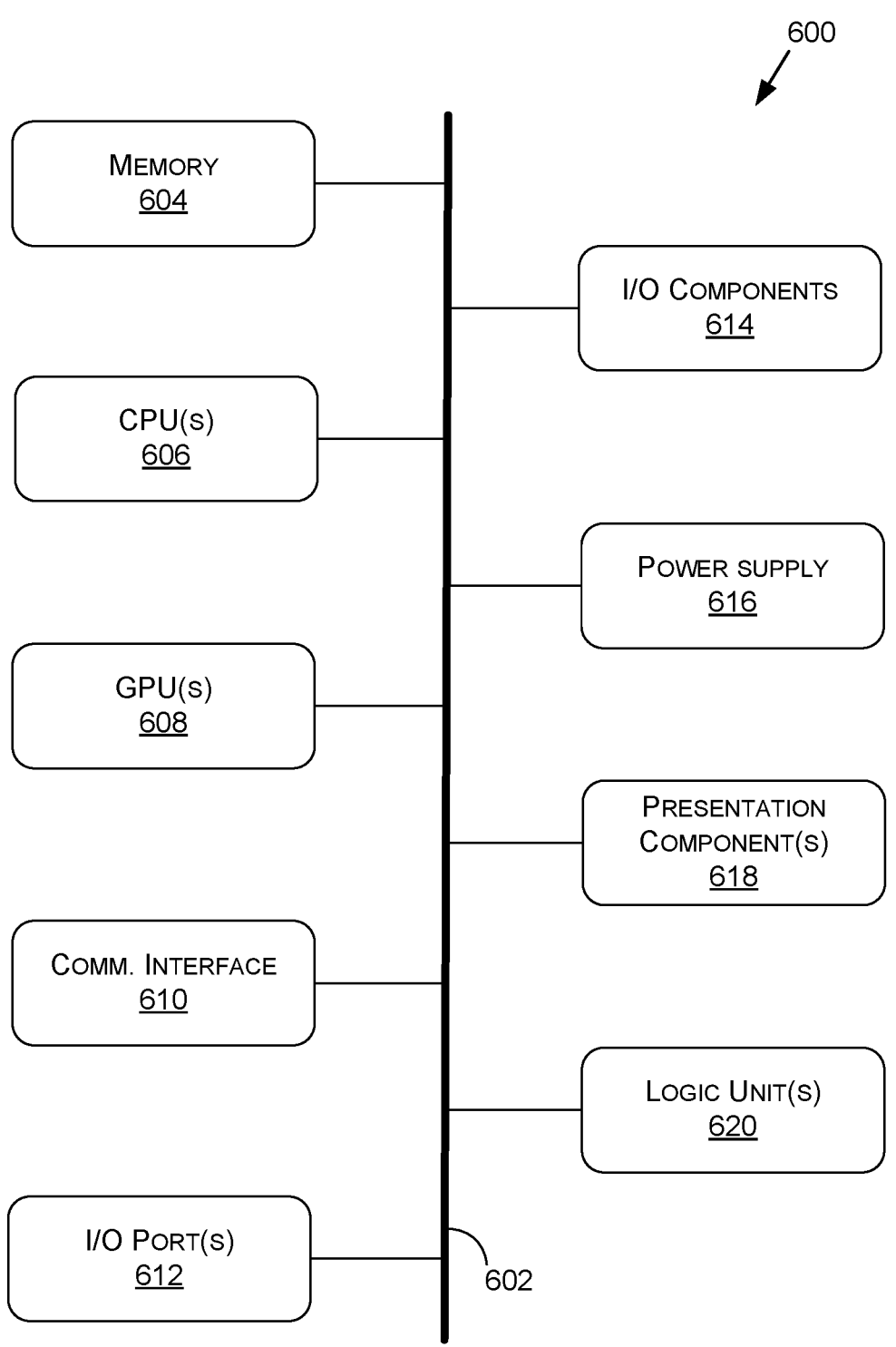
FIG. 6 is a block diagram of an example computing device suitable for use in implementing some embodiments of the present disclosure.

FIG. 6 is a block diagram of an example computing device(s) 600 suitable for use in implementing some embodiments of the present disclosure. Computing device 600 may include an interconnect system 602 that directly or indirectly couples the following devices: memory 604, one or more central processing units (CPUs) 606, one or more graphics processing units (GPUs) 608, a communication interface 610, input/output (I/O) ports 612, input/output components 614, a power supply 616, one or more presentation components 618 (e.g., display(s)), and one or more logic units 620. In at least one embodiment, the computing device(s) 600 may comprise one or more virtual machines (VMs), and/or any of the components thereof may comprise virtual components (e.g., virtual hardware components). For non-limiting examples, one or more of the GPUs 608 may comprise one or more vGPUs, one or more of the CPUs 606 may comprise one or more vCPUs, and/or one or more of the logic units 620 may comprise one or more virtual logic units. As such, a computing device(s) 600 may include discrete components (e.g., a full GPU dedicated to the computing device 600), virtual components (e.g., a portion of a GPU dedicated to the computing device 600), or a combination thereof.

Although the various blocks of FIG. 6 are shown as connected via the interconnect system 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 6.

The interconnect system 602 may represent one or more links or busses, such as an address bus, a data bus, a control bus, or a combination thereof. The interconnect system 602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 606 may be directly connected to the memory 604. Further, the CPU 606 may be directly connected to the GPU 608. Where there is direct, or point-to-point connection between components, the interconnect system 602 may include a PCIe link to carry out the connection. In these examples, a PCI bus need not be included in the computing device 600.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 606 may be configured to execute at least some of the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an Advanced RISC Machines (ARM) processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

In addition to or alternatively from the CPU(s) 606, the GPU(s) 608 may be configured to execute at least some of the computer-readable instructions to control one or more components of the computing device 600 to perform one or more of the methods and/or processes described herein. One or more of the GPU(s) 608 may be an integrated GPU (e.g., with one or more of the CPU(s) 606 and/or one or more of the GPU(s) 608 may be a discrete GPU. In embodiments, one or more of the GPU(s) 608 may be a coprocessor of one or more of the CPU(s) 606. The GPU(s) 608 may be used by the computing device 600 to render graphics (e.g., 3D graphics) or perform general purpose computations. For example, the GPU(s) 608 may be used for General-Purpose computing on GPUs (GPGPU). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data or any other suitable data, such as GPGPU data. The display memory may be included as part of the memory 604. The GPU(s) 608 may include two or more GPUs operating in parallel (e.g., via a link). The link may directly connect the GPUs (e.g., using NVLINK) or may connect the GPUs through a switch (e.g., using NVSwitch). When combined together, each GPU 608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 606 and/or the GPU(s) 608, the logic unit(s) 620 may be configured to execute at least some of the computer-readable instructions to control one or more components of the computing device 600 to perform one or more of the methods and/or processes described herein. In embodiments, the CPU(s) 606, the GPU(s) 608, and/or the logic unit(s) 620 may discretely or jointly perform any combination of the methods, processes and/or portions thereof. One or more of the logic units 620 may be part of and/or integrated in one or more of the CPU(s) 606 and/or the GPU(s) 608 and/or one or more of the logic units 620 may be discrete components or otherwise external to the CPU(s) 606 and/or the GPU(s) 608. In embodiments, one or more of the logic units 620 may be a coprocessor of one or more of the CPU(s) 606 and/or one or more of the GPU(s) 608.

Examples of the logic unit(s) 620 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 610 may include one or more receivers, transmitters, and/or transceivers that enable the computing device 600 to communicate with other computing devices via an electronic communication network, included wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 620 and/or communication interface 610 may include one or more data processing units (DPUs) to transmit data received over a network and/or through interconnect system 602 directly to (e.g., a memory of) one or more GPU(s) 608.

The I/O ports 612 may enable the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, DPUs, etc.), and output the data (e.g., as an image, video, sound, etc.).

Example Data Center

Figure 7:
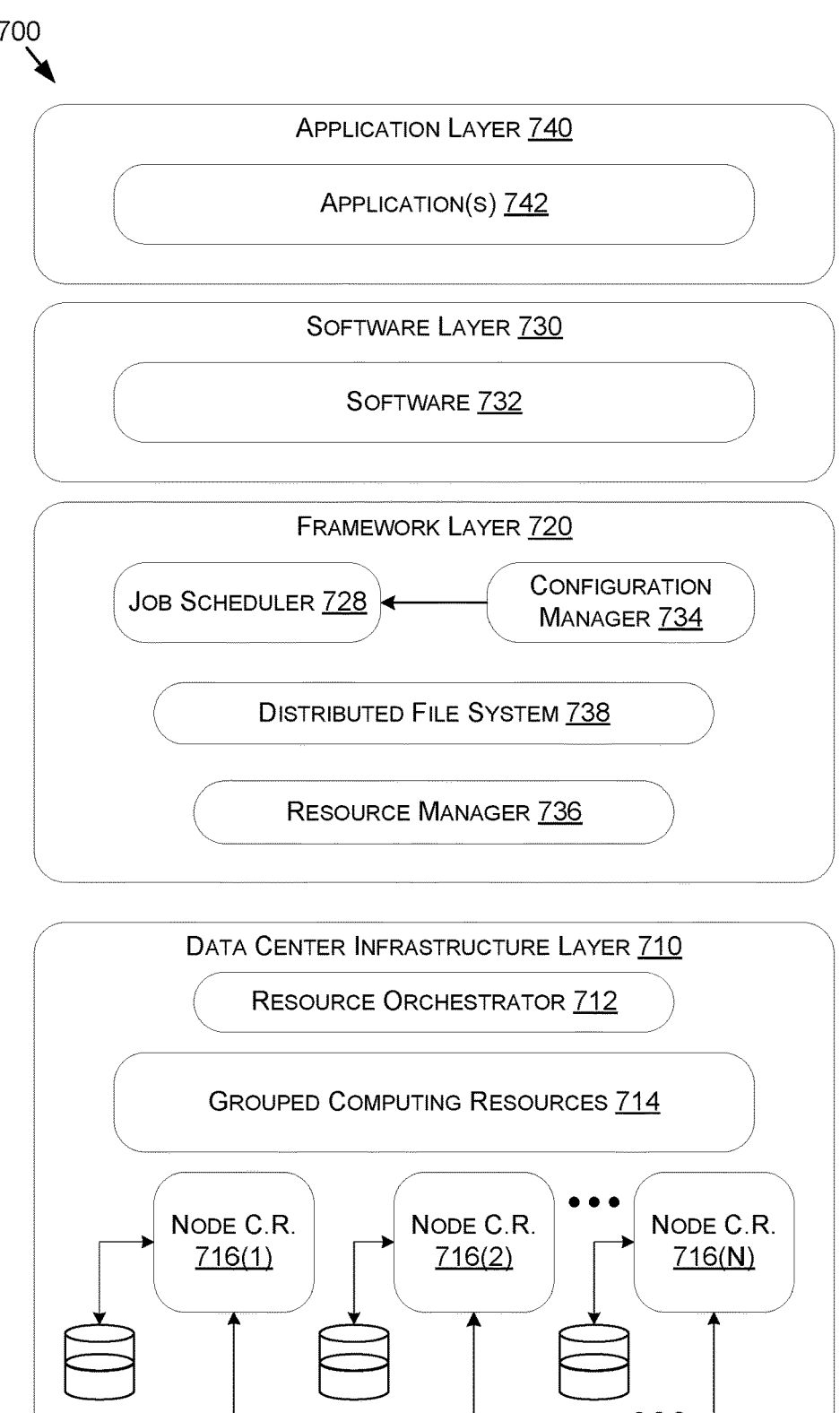
FIG. 7 is a block diagram of an example data center suitable for use in implementing some embodiments of the present disclosure.

FIG. 7 illustrates an example data center 700 that may be used in at least one embodiments of the present disclosure. The data center 700 may include a data center infrastructure layer 710, a framework layer 720, a software layer 730, and/or an application layer 740.

As shown in FIG. 7, the data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 716(1)-716(N) may correspond to a server having one or more of the above-mentioned computing resources. In addition, in some embodiments, the node C.R.s 716(1)-7161(N) may include one or more virtual components, such as vGPUs, vCPUs, and/or the like, and/or one or more of the node C.R.s 716(1)-716(N) may correspond to a virtual machine (VM).

In at least one embodiment, grouped computing resources 714 may include separate groupings of node C.R.s 716 housed within one or more racks (not shown), or many racks housed in data centers at various geographical locations (also not shown). Separate groupings of node C.R.s 716 within grouped computing resources 714 may include grouped compute, network, memory or storage resources that may be configured or allocated to support one or more workloads. In at least one embodiment, several node C.R.s 716 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 712 may configure or otherwise control one or more node C.R.s 716(1)-716(N) and/or grouped computing resources 714. In at least one embodiment, resource orchestrator 712 may include a software design infrastructure (SDI) management entity for the data center 700. The resource orchestrator 712 may include hardware, software, or some combination thereof.

In at least one embodiment, as shown in FIG. 7, framework layer 720 may include a job scheduler 728, a configuration manager 734, a resource manager 736, and/or a distributed file system 738. The framework layer 720 may include a framework to support software 732 of software layer 730 and/or one or more application(s) 742 of application layer 740. The software 732 or application(s) 742 may respectively include web-based service software or applications, such as those provided by Amazon Web Services, Google Cloud and Microsoft Azure. The framework layer 720 may be, but is not limited to, a type of free and open-source software web application framework such as Apache Spark™ (hereinafter "Spark") that may utilize distributed file system 738 for large-scale data processing (e.g., "big data"). In at least one embodiment, job scheduler 728 may include a Spark driver to facilitate scheduling of workloads supported by various layers of data center 700. The configuration manager 734 may be capable of configuring different layers such as software layer 730 and framework layer 720 including Spark and distributed file system 738 for supporting large-scale data processing. The resource manager 736 may be capable of managing clustered or grouped computing resources mapped to or allocated for support of distributed file system 738 and job scheduler 728. In at least one embodiment, clustered or grouped computing resources may include grouped computing resource 714 at data center infrastructure layer 710. The resource manager 736 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 738 of framework layer 720. One or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 738 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 734, resource manager 736, and resource orchestrator 712 may implement any number and type of self-modifying actions based on any amount and type of data acquired in any technically feasible fashion. Self-modifying actions may relieve a data center operator of data center 700 from making possibly bad configuration decisions and possibly avoiding underutilized and/or poor performing portions of a data center.

The data center 700 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 700. In at least one embodiment, trained or deployed machine learning models corresponding to one or more neural networks may be used to infer or predict information using resources described above with respect to the data center 700 by using weight parameters calculated through one or more training techniques, such as but not limited to those described herein.

In at least one embodiment, the data center 700 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 600 of FIG. 6—e.g., each device may include similar components, features, and/or functionality of the computing device(s) 600. In addition, where backend devices (e.g., servers, NAS, etc.) are implemented, the backend devices may be included as part of a data center 700, an example of which is described in more detail herein with respect to FIG. 7.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 600 described herein with respect to FIG. 6. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:

receiving, by an interconnect bridge of a first chip, an eviction request from a client of the first chip;

determining, by the interconnect bridge of the first chip, a message of a different transaction than the eviction request;

based at least on the message corresponding to a same cache line as the eviction request and the eviction request being of an eviction request type, determining, by the interconnect bridge, whether the eviction request has been transmitted to a second chip using an ordered communication fabric between the first chip and the second chip, the ordered communication fabric and the second chip configured to guarantee that the eviction request and the message are completed by the second chip in an order in which the interconnect bridge transmits the eviction request and the message over the ordered communication fabric; and based at least on the determining whether the eviction request has been transmitted and the eviction request being transmitted to the second chip using the ordered communication fabric, transmitting, by the interconnect bridge and without the first chip waiting for the second chip to complete the eviction request, the message to the second chip using the ordered communication fabric.

2. The method of claim 1, wherein the interconnect bridge further provides an internal completion acknowledgement of the eviction request to the client without waiting for the second chip to complete the eviction request.

3. The method of claim 1, wherein the transmitting is performed without the second chip having completed the eviction request from the first chip and the message comprises a read request to the same cache line.

4. The method of claim 1, wherein the eviction request is for the client to relinquish ownership permissions of the same cache line with respect to at least two clients, the second chip uses the message from the first chip to push the eviction request, received from the first chip, to a second client of the at least two clients, the second client is on the second chip.

5. The method of claim 1, wherein the message includes one or more of a read request or a snoop response.

6. The method of claim 1, further comprising the interconnect bridge of the first chip deallocating the same cache line from the client based at least on the receiving of the eviction request from the client of the first chip.

7. The method of claim 1, wherein the message is based at least on a snoop request and the transmitting of the message to the second chip is based at least on the interconnect bridge determining a completion response for the eviction request has not yet been transmitted to the client of the first chip.

8. The method of claim 1, wherein the message is based at least on a snoop request and the interconnect bridge of the first chip retrieves the message from the client of the first chip based at least on determining the interconnect bridge has already transmitted a completion response for the eviction request to the client of the first chip.

9. The method of claim 1, wherein the ordered communication fabric is implemented using one or more of a point-to-point communication network or sequence numbers assigned to network communications.

10. The method of claim 1, further comprising the interconnect bridge transmitting, to the second chip, a copy back request with copy back write data corresponding to the copy back request.

11. The method of claim 1, further comprising the interconnect bridge of the second chip:

transmitting an inter-chip completion data response for a read unique request from the first chip to the first chip; and providing an internal completion acknowledgement for the read unique request to a client of the second chip without waiting for an inter-chip completion acknowledgement for the inter-chip completion data response from the first chip.

12. At least one processor comprising:

one or more circuits of a first chip to:

receive a request to relinquish, from a client, ownership permissions of a portion of memory with respect to at least two clients;

receive a message corresponding to the portion of memory;

determine the message and the request to relinquish ownership permissions correspond to the portion of memory; and based at least on the message and the request corresponding to the portion of memory and the request being of an eviction request type, push, over an ordered communication fabric and without the first chip waiting for a second chip to complete the request, the request to relinquish ownership of the portion of memory to the second chip using the message, the ordered communication fabric and the second chip configured to guarantee that the request and the message are completed by the second chip in an order in which the first chip transmits the request and the message over the ordered communication fabric.

13. The at least one processor of claim 12, wherein the one or more circuits are to transmit the message to the second chip without the first chip having received a completion response for the request from the second chip.

14. The at least one processor of claim 12, where the second chip uses the message from the first chip to push the request, received from the first chip, to a client of the second chip.

15. The at least one processor of claim 12, wherein the at least one processor is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing generative AI operations;

a system for performing operations using a large language model;

a system for performing deep learning operations;

a system implemented using an edge device;

a system implemented using a robot;

a system for performing conversational AI operations;

a system for generating synthetic data;

a system for presenting at least one of virtual reality content, augmented reality content, or mixed reality content;

a system incorporating one or more virtual machines (VMs);

a system implemented at least partially in a data center; or a system implemented at least partially using cloud computing resources.

16. A system comprising:

one or more processing units to perform operations including pushing, from a first chip to a second chip and over an ordered communication fabric, a request to relinquish, from a client, ownership permissions of a portion of memory with respect to at least two clients, the ordered communication fabric and the second chip configured to guarantee that the request and a message that corresponds to a same portion of memory as the request are completed by the second chip in an order in which the first chip transmits the request and the message over the ordered communication fabric and the pushing being based at least on:

receiving the message corresponding to a different transaction type than the request, and the request being of an eviction request type.

17. The system of claim 16, wherein the request is transmitted to the second chip without the first chip having received a completion response for the request from the second chip.

18. The system of claim 16, where the second chip uses the message from the first chip to push the request, received from the first chip, to a client of the second chip.

19. The system of claim 16, wherein the message includes one or more of a read request or a snoop response.

20. The system of claim 16, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system for performing generative AI operations;

a system for performing operations using a large language model;

a system for performing conversational AI operations;

a system for generating synthetic data;

a system for presenting at least one of virtual reality content, augmented reality content, or mixed reality content;

a system incorporating one or more virtual machines (VMs);

a system implemented at least partially in a data center; or a system implemented at least partially using cloud computing resources.

* * * * *